3,169,054
METHOD AND APPARATUS FOR USE OF FLY
DUST FROM METALLURGICAL FURNACES
Hermann Werner, Frankfurt am Main, Germany, assignor
to Metallgesellschaft Aktiengesellschaft, Frankfurt am
Main, Germany
Filed Dec. 6, 1961, Ser. No. 157,469
Claims priority, application Germany, Jan. 19, 1961,
M 47,734
2 Claims. (Cl. 75—3)

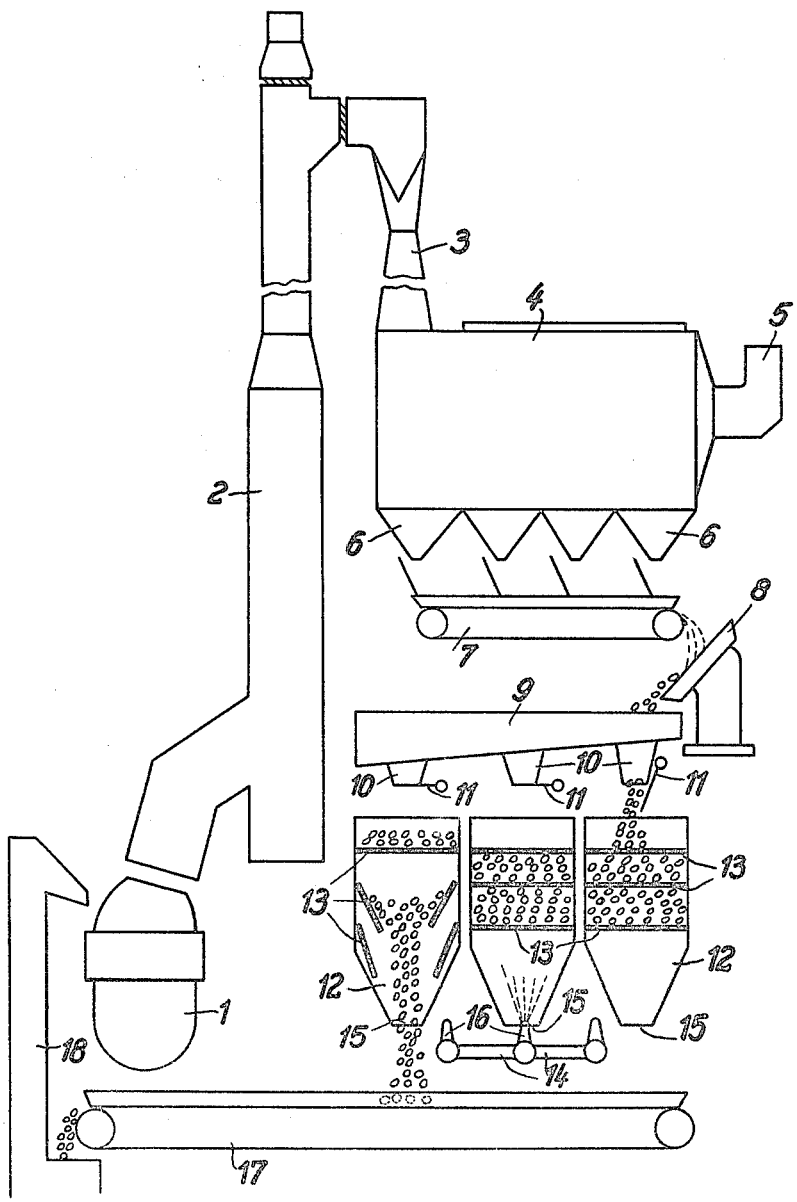

It is conventional to dry the dust precipitated from the fly dust carried by the waste gases from metallurgical furnaces in order to recycle this dust to a furnace, as for example, a converter and especially an oxygen converter. This is accomplished by collecting the precipitated dust in a hopper attached, for example, to an electric filter, then filling sacks with the dust, and loading the sacks into a truck for transport to a furnace. A large portion of this dust, when introduced into a furnace, is immediately carried away by the hot gases and therefore is unused in the furnace. Furthermore, this sacking and transporting of the dust from the hopper to the furnace cannot be accomplished without the escape of some of the dust and thereby the dirtying of the furnace area.

In this invention, it has been found that it is possible to moisten the dust taken from the precipitator hopper and then introduce the moistened dust into the furnace. A greater portion of the dust is then used in the furnace, because the moisture prevents the otherwise very light, dry dust from being carried away by the hot gases.

In accordance with this invention, the flue dust contained in the waste gases of metallurgical furnaces, preferably converters for the manufacture of steel, is precipitated in an electric filter, and the precipitated dust, in accordance with its hydrated component parts, is pelletized and the dust in the form of fresh pellets immediately recycled into the furnace.

When the fresh pellets contain more than from about 8 to 12% of water, they then must be dried in order to increase their mechanical hardness or stability, but the extent of drying is limited to a removal of from about 1 to 2% of the moisture content of the fresh pellets.

It has been found, however, that sometimes the pellets so dried would burst either during the drying period or while being dumped and stored so that they revert to dust. It has been further found that this lack of pellet durability is due to the calcium content (CaO) of the dust as a hydrated component part. The fresh green pellets as formed contain about 8 to 10% water. Pellets with a calcium content of 15% will burst during drying because of the high heat developed during the slaking reaction of the calcuim within a period of two hours. However, in steel mills, it is impossible to store the pellets for a longer period of time. The slaking reaction of calcium according to the formula $$CaO + H_2O = Ca(OH)_2$$

depends upon the temperature and quickens the higher the temperature. During drying and hardening of the fly dust pellets having a normal calcium content of, for example, 10% and a moisture content of from 8 to 12%, such high temperatures, by reason of the slaking reaction, occur in the hopper so that the speed of the slaking reaction is increased, which again leads to a further increase in temperature and the destruction of the pellets.

According to this invention, the fresh pellets made from dust having a calcium content from about 6 to 20% are dried by gas having a temperature of from about 15 to 30° C. under a forced draft and with a slightly above atmospheric pressure of about 200 mm. for a period of time until they have lost from about 1 to 2% of their moisture content so that the heat of reaction is at a temperature of from about 40 to 55° C., at which temperature, the pellets are hardened without bursting.

This invention has the advantage in that the drying gas such as air and/or waste gases, such as cooled converter gas, are not at such a high temperature as would lead to the damage and destruction of the pellets, but nevertheless the moisture content of the pellets is reduced within prescribed limits. The hardening of the pellets is not spontaneous and can be adjusted to any desired period of time, with the pellets receiving such a degree of hardness or durability so that they can be stored for a longer period of time without damage.

When the flue dust has a calcium content (CaO) between 1 to 6%, additional CaO is added to the dust before or during the pelletizing step to bring the pellets up to a 10% calcium content, so that good pellets are formed which only require a limited drying time.

When the pellets have a calcium content of not more than 8%, warm air and/or waste gases at a temperature of from about 50 to 80° C. can be drawn through a drying hopper for the limited drying and hardening of the pellets. It has been found that, with this temperature range for the drying gases, there is no spontaneous slaking reaction for the calcium, and accordingly, no pellet destructive high temperatures.

The apparatus for performing the process of this invention includes novel hoppers, each having movable grates and nozzles for introducing the drying gas into the hoppers.

The means by which the objects of the invention are obtained are described more fully with reference to the accompanying schematic drawing which shows an apparatus for recycling the flue dust produced by a furnace.

The waste gases from the furnace or converter 1 flow into chimney 2. After flowing through measuring nozzles, the gases pass through pipe 3 into the dry electric filter 4 at a temperature of about 150° C. and are exhausted from the filter through pipe 5. The precipitated dust collected in hoppers 6 drops to conveyor belt 7 which takes the dust to an inclined rotating pelletizing disc 8 whereon the dust is mixed with water and formed into pellets. The freshly formed pellets having a diameter of up to about 20 mm. fall from the pelletizer 8 into a trough 9 from which they can be dropped through one or more openings 10 by means of a flap valve 11. Beneath each opening is a drying hopper 12. Each drying hopper is provided with a plurality of vertically separated individual grates 13, each of which is movably mounted in its hopper so that the grates can be displaced, moved or folded. This permits the pellets to be formed in spaced layers at varied heights with a necessary intermediate space between each layer. The upper grates are moved out of the way so that the lowermost grates can be first covered. Blower 14 is movable beneath the bottom opening 15 of each hopper so that air or waste gases can be blown into the lower portion of a hopper through a nozzle 16. If necessary, waste gases can be used containing carbonic acid, but preferably converter gas is used. The drying gas is blown into the hopper as long as it is necessary, as, for example, 8 hours, until the pellets in that hopper are hardened. As shown in the drawing, the middle hopper 12 is being blown. After the drying and hardening of the pellets is completed, blower 14 is removed from the opening of that particular hopper 12, the intermediate grates 13 are removed so that the pellets now dried to a prescribed limit drop onto a conveyor belt 17 and are carried either directly to a converter or to an elevator 18 for introduction into the converter 1, or may be temporarily stored in a bin.

Having now described the means by which the objects of the invention are obtained, I claim:

1. In the process of recycling dust containing from 6 to about 20% calcium oxide precipitated from waste gases back to a metallurgical furnace, the improvement comprising forming pellets of the dust mixed with from 8 to 12% water, blowing gas through a layer of pellets to dry said pellets at a gas temperature of from about 15 to 30° C. and at a slightly greater than atmospheric pressure of about 200 mm. to remove about from 1 to 2% of the water whereby the remaining water in said pellets hardens said pellets with the heat of the slaking reaction at a non-bursting pellet temperature of from about 40 to 55° C.

2. In the process of claim 1, further comprising adjusting dust containing less than 6% calcium oxide to a calcium oxide content of about 10% before drying pellets made from said dust.

References Cited by the Examiner

UNITED STATES PATENTS

| | | | |
|---|---|---|---|
| 765,789 | 7/04 | Peppel | 75—3 |
| 933,269 | 9/09 | Schumacher | 75—3 |
| 933,270 | 9/09 | Schumacher | 75—3 |
| 1,047,174 | 12/12 | Collard | 75—3 |
| 1,073,381 | 9/13 | Wolle et al. | 75—3 |
| 1,312,218 | 8/19 | Vogel | 75—3 |
| 1,478,215 | 12/23 | Giesecke | 75—3 |
| 2,807,534 | 9/57 | Haley et al. | 75—3 |
| 2,833,643 | 5/58 | Newman | 75—41 |
| 2,836,487 | 5/58 | Fastje et al. | 75—41 |
| 2,848,208 | 8/58 | Wynne et al. | 263—29 |
| 3,003,756 | 10/61 | Steffensen | 263—29 |

BENJAMIN HENKIN, *Primary Examiner.*